US008266566B2

(12) United States Patent
Hopkins et al.

(10) Patent No.: US 8,266,566 B2
(45) Date of Patent: Sep. 11, 2012

(54) STABILITY-DEPENDENT SPARE CELL INSERTION

(75) Inventors: Jeremy T. Hopkins, Round Rock, TX (US); Julie A. Rosser, Austin, TX (US); Samuel I. Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 12/879,516

(22) Filed: Sep. 10, 2010

(65) Prior Publication Data
US 2012/0066654 A1      Mar. 15, 2012

(51) Int. Cl.
G06F 9/455      (2006.01)
G06F 17/50     (2006.01)
G06F 15/04     (2006.01)

(52) U.S. Cl. ......... 716/119; 716/113; 716/114; 716/139

(58) Field of Classification Search .................. 716/113, 716/114, 119, 139
See application file for complete search history.

(56) References Cited

U.S. PATENT DOCUMENTS

| | | | |
|---|---|---|---|
| 5,508,939 A | 4/1996 | Kim et al. | |
| 5,623,420 A | 4/1997 | Yee et al. | |
| 6,453,454 B1 | 9/2002 | Lee et al. | |
| 6,553,548 B1 | 4/2003 | Hekmatpour | |
| 7,107,551 B1 | 9/2006 | de Dood et al. | |
| 7,594,202 B2 | 9/2009 | de Dood et al. | |
| 2002/0162086 A1* | 10/2002 | Morgan | 716/18 |
| 2003/0233625 A1* | 12/2003 | Brazell et al. | 716/8 |
| 2006/0075370 A1 | 4/2006 | Williams et al. | |
| 2008/0005712 A1* | 1/2008 | Charlebois et al. | 716/10 |
| 2008/0222595 A1* | 9/2008 | Hsin | 716/18 |
| 2009/0113368 A1 | 4/2009 | Lin et al. | |
| 2009/0178013 A1* | 7/2009 | Wang et al. | 716/2 |
| 2009/0249273 A1 | 10/2009 | Tsai et al. | |
| 2010/0050142 A1* | 2/2010 | Dirks et al. | 716/6 |
| 2010/0201400 A1* | 8/2010 | Nardone et al. | 326/101 |
| 2011/0072407 A1* | 3/2011 | Keinert et al. | 716/122 |

OTHER PUBLICATIONS

Tang, Xiaoping et al., "Optimal Redistribution of White Space for Wire Length Minimization," Proc. of the 2005 Asia and South Pacific Design Automation Conference, vol. 1, pp. 412-417 (Jan. 2005).
Ren, Haoxing et al., "Diffusion-Based Placement Migration," Proc. of the 42nd Annual Design Automation Conference, pp. 515-520 (Jun. 2005).

* cited by examiner

*Primary Examiner* — Suresh Memula
(74) *Attorney, Agent, or Firm* — Matthew W. Baca; Jack V. Musgrove

(57) ABSTRACT

Spare cells are placed in an IC design using stability values associated with logic cones of the design. A desired spare cell utilization rate is assigned to a cone based on its stability value, and an actual spare cell utilization rate for the cone bounding box is calculated. If the actual utilization rate is less than the desired utilization rate, additional spare cells are inserted as needed to attain the desired utilization rate. The stability value is provided by a logic or circuit designer, or derived from historical information regarding the logic cone in a previous design iteration. Spare cells are placed for each logic cone in the design until a global spare cell utilization target is exceeded. The spare cell placement method can be an integrated part of a placement directed synthesis which is followed by early mode padding and design routing.

19 Claims, 4 Drawing Sheets

STABILITY-DEPENDENT SPARE CELL INSERTION

BACKGROUND OF THE INVENTION

1. Field of the Invention

The present invention generally relates to the design of semiconductor chips and integrated circuits, and more particularly to a method of inserting spare cell locations in an integrated circuit design to accommodate engineering changes.

2. Description of the Related Art

Integrated circuits are used for a wide variety of electronic applications, from simple devices such as wristwatches, to the most complex computer systems. A microelectronic integrated circuit (IC) chip can be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements combined to perform a logic function. Cell types include, for example, core cells, scan cells, input/output (I/O) cells, and memory (storage) cells.

An IC chip is fabricated by first conceiving a logical (behavioral) description for the circuit, and converting that logical description into a physical description, or geometric layout. This process is carried out in steps, such as first generating a register-transfer level (RTL) description of the circuit based on the logical description, and then using logic synthesis to derive a gate level description or "netlist." A netlist is a record of all of the nets (interconnections) between cell pins, including information about the various components such as transistors, resistors and capacitors. The circuit layout is then checked to ensure that it meets all of the design requirements, particularly timing requirements, and may go through several iterations of analysis and refinement.

Cell placement in semiconductor fabrication involves a determination of where particular cells should optimally (or near-optimally) be located in a layer of an integrated circuit device. Due to the large number of components and the details required by the fabrication process for very large scale integrated (VLSI) devices such as microprocessors and application-specific integrated circuits (ASICs), physical design is not practical without the aid of computers. As a result, most phases of physical design extensively use computer-aided design tools, and many phases have already been partially or fully automated. Automation of the physical design process has increased the level of integration, reduced turn around time and enhanced chip performance. Several different hardware-description programming languages (HDL) have been created for electronic design automation, including Verilog, C, VHDL and TDML. A typical electronic design automation system receives one or more high level behavioral descriptions of an IC device, and translates this high level design language description into netlists of various levels of abstraction.

Once a design is mostly finished, slight modifications may still be required to meet last-minute changes to specifications or for other reasons, usually relayed as an engineering change order (ECO). Because the circuit design is substantially complete (i.e., it conforms to various design requirements such as timing and slew), it is important to minimize the impact of any changes which might otherwise lead to violations and thus require additional iterations of the design steps, meaning significant computational expense. In order to alleviate this predicament, designers place filler (ECO) cells in the circuit design which have no function other than providing spare locations as needed for later changes. These spare locations can be provided in additional to surplus latches that are inserted in a design. A certain percentage of the total number of cells is designated for filler cells, and those cells are randomly placed throughout the layout.

In a traditional synthesis environment, as illustrated by FIG. 1, spare gate insertion has been a post placement, rule-based procedure. The design process begins with placement directed synthesis (2), followed by early mode padding (4). Placement directed synthesis is generally the step-by-step integration of logic synthesis and placement to overcome problems in achieving timing closure, and may for example include technology mapping, physical placement, electrical correction, and timing legalization. Early mode padding refers to insertion of delay cells (pads) along faster paths in the circuit design in order to correct early-mode timing violations. After these steps are completely finished, spare cells are inserted into the design (6). The process then continues to design routing (wiring) to properly connect the placed components while obeying all design rules for the integrated circuit (8).

The use of spare cells greatly simplifies implementation of ECOs but there can still be problems with the locations of these cells. Since the filler percentage is applied globally to an entire design, some areas of the circuit which are more stable can end up getting too many filler cells, while other areas do not get enough. Furthermore, typical placement tools can push filler cells away from the most critical logic (which is often unstable), so even though there are filler cells available, they are not located close enough to be of use for timing/logic fixes. Placement tools that partition the logic into separate bins can experience additional stability issues whenever the bin sizes or locations change.

Placement tools (particularly those which attempt to minimize wire length using quadratic placement) naturally pull connected logic together very tightly. This logic clustering effect can be countered by introducing a spreading factor to artificially increase instance sizes globally in a circuit design or portion thereof, i.e., a macro. Forcing cells within the macro to separate in this manner also improves routing and congestion issues. However, this spreading force is not effective for ECO work because it adds only a small amount of space to a large region instead of targeting areas that have a higher potential to change. These problems are exacerbated in high density circuit designs which have gone through multiple ECOs. The interior filler cells are exhausted early on, leaving an insufficient number of spare cell locations that are still close enough to associated logic gates.

In light of the foregoing, it would be desirable to devise an improved method of placing spare cell locations in an integrated circuit design which could avoid clustering problems associated with conventional placement tools. It would be further advantageous if the method could increase availability of spare cells for portions of an integrated circuit design which may be less stable.

SUMMARY OF THE INVENTION

It is therefore one object of the present invention to provide an improved method of placing spare cell locations in an integrated circuit design.

It is another object of the present invention to provide such a method which avoids clustering problems associated with conventional placement tools that tend to force spare cell locations to the periphery of a design.

It is yet another object of the present invention to provide enhanced designer control over spare cell locations for specifically designated logic of the integrated circuit design.

The foregoing objects are achieved in a method of placing spare cells in an integrated circuit design having a logic cone and a stability value associated with the logic cone, by assigning a desired spare cell utilization rate to the logic cone based on the stability value, calculating an actual spare cell utilization rate for a bounding box of the logic cone, determining that the actual spare cell utilization rate is less than the desired spare cell utilization rate, computing additional area required in the bounding box for attaining the desired spare cell utilization rate, and inserting spare cells within the bounding box to completely fill the additional area. The stability value can be derived from historical information regarding the logic cone in a previous design iteration. In the illustrative implementation the desired spare cell utilization rate is assigned using a table lookup. The actual spare cell utilization rate can be the total area of all spare cells within the bounding box divided by the bounding box area. The method can be repeated iteratively for each logic cone in the design until a global spare cell utilization target is exceeded.

The spare cell placement method can be an integrated part of a placement directed synthesis which is followed by early mode padding and design routing.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
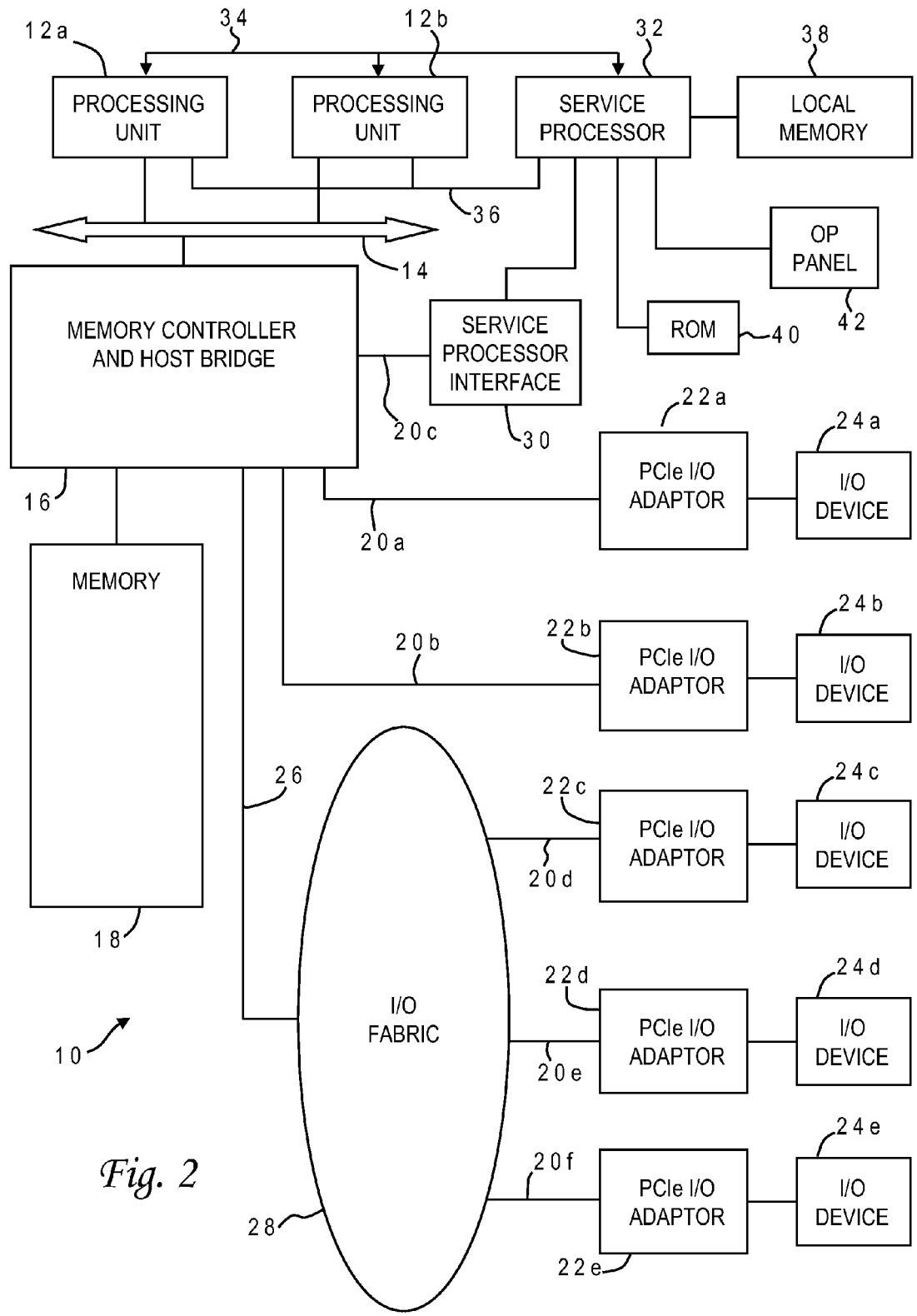
FIG. 2 is a block diagram of a computer system programmed to carry out integrated circuit design in accordance with one embodiment of the present invention.

With reference now to the figures, and in particular with reference to FIG. 2, there is depicted one embodiment 10 of a computer system in which the present invention may be implemented to carry out the design of an integrated circuit. Computer system 10 is a symmetric multiprocessor (SMP) system having a plurality of processors 12a, 12b connected to a system bus 14. System bus 14 is further connected to a combined memory controller/host bridge (MC/HB) 16 which provides an interface to system memory 18. System memory 18 may be a local memory device or alternatively may include a plurality of distributed memory devices, preferably dynamic random-access memory (DRAM). There may be additional structures in the memory hierarchy which are not depicted, such as on-board (L1) and second-level (L2) or third-level (L3) caches.

MC/HB 16 also has an interface to peripheral component interconnect (PCI) Express links 20a, 20b, 20c. Each PCI Express (PCIe) link 20a, 20b is connected to a respective PCIe adaptor 22a, 22b, and each PCIe adaptor 22a, 22b is connected to a respective input/output (I/O) device 24a, 24b. MC/HB 16 may additionally have an interface to an I/O bus 26 which is connected to a switch (I/O fabric) 28. Switch 28 provides a fan-out for the I/O bus to a plurality of PCI links 20d, 20e, 20f. These PCI links are connected to more PCIe adaptors 22c, 22d, 22e which in turn support more I/O devices 24c, 24d, 24e. The I/O devices may include, without limitation, a keyboard, a graphical pointing device (mouse), a microphone, a display device, speakers, a permanent storage device (hard disk drive) or an array of such storage devices, an optical disk drive, and a network card. Each PCIe adaptor provides an interface between the PCI link and the respective I/O device. MC/HB 16 provides a low latency path through which processors 12a, 12b may access PCI devices mapped anywhere within bus memory or I/O address spaces. MC/HB 16 further provides a high bandwidth path to allow the PCI devices to access memory 18. Switch 28 may provide peer-to-peer communications between different endpoints and this data traffic does not need to be forwarded to MC/HB 16 if it does not involve cache-coherent memory transfers. Switch 28 is shown as a separate logical component but it could be integrated into MC/HB 16.

In this embodiment, PCI link 20c connects MC/HB 16 to a service processor interface 30 to allow communications between I/O device 24a and a service processor 32. Service processor 32 is connected to processors 12a, 12b via a JTAG interface 34, and uses an attention line 36 which interrupts the operation of processors 12a, 12b. Service processor 32 may have its own local memory 38, and is connected to read-only memory (ROM) 40 which stores various program instructions for system startup. Service processor 32 may also have access to a hardware operator panel 42 to provide system status and diagnostic information.

In alternative embodiments computer system 10 may include modifications of these hardware components or their interconnections, or additional components, so the depicted example should not be construed as implying any architectural limitations with respect to the present invention.

When computer system 10 is initially powered up, service processor 32 uses JTAG interface 34 to interrogate the system (host) processors 12a, 12b and MC/HB 16. After completing the interrogation, service processor 32 acquires an inventory and topology for computer system 10. Service processor 32 then executes various tests such as built-in-self-tests (BISTs), basic assurance tests (BATs), and memory tests on the components of computer system 10. Any error information for failures detected during the testing is reported by service processor 32 to operator panel 42. If a valid configuration of system resources is still possible after taking out any components found to be faulty during the testing then computer system 10 is allowed to proceed. Executable code is loaded into memory 18 and service processor 32 releases host processors 12a, 12b for execution of the program code, e.g., an operating system (OS) which is used to launch applications and in particular the circuit design application of the present invention, results of which may be stored in a hard disk drive of the system (an I/O device 24). While host processors 12a, 12b are executing program code, service processor 32 may enter a mode of monitoring and reporting any operating parameters or errors, such as the cooling fan speed and operation, thermal sensors, power supply regulators, and recoverable and non-recoverable errors reported by any of processors 12a, 12b, memory 18, and MC/HB 16. Service processor 32 may take further action based on the type of errors or defined thresholds.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this invention, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. Such storage media excludes transitory media such as propagating signals.

The computer program instructions may further be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer system 10 carries out program instructions for a novel spare cell insertion technique to manage engineering change orders as part of an overall circuit design process. Accordingly, a program embodying the invention may include conventional aspects of various circuit design tools, and these details will become apparent to those skilled in the art upon reference to this disclosure.

Figure 3:
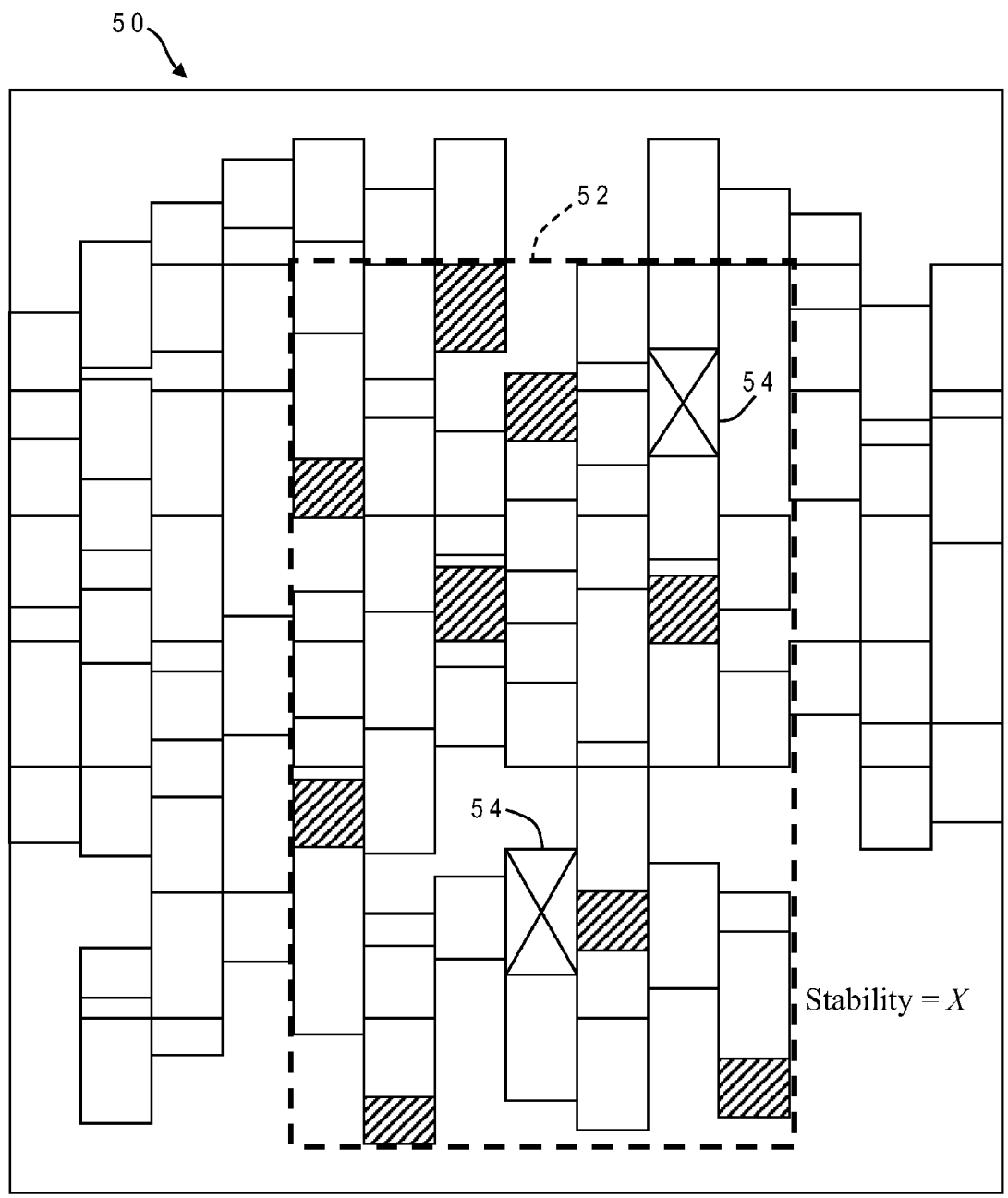
FIG. 3 is a plan view of an integrated circuit layout illustrating spare cell locations and a logic cone which is used to define a bounding box for a spare cell insertion procedure in accordance with one implementation of the present invention.

Referring now to FIG. 3, there is depicted a simplified layout 50 of an integrated circuit design, or portion thereof such as a macro, which may be enhanced by inserting spare cell locations for engineering change orders (ECOs) in accordance with an exemplary application of the present invention. Layout 50 includes a plurality of cells having various sizes and functions according to the intended use of the integrated circuit. The cells can be laid out in an orthogonal coordinate system using horizontal and vertical tracks to provide interconnections between the cells. Layout 50 may be one layer of a multi-layer macro or integrated circuit design. Layout 50 is simplified in that it shows a relatively small number of cells and tracks. State of the art designs for microprocessors and application-specific integrated circuits (ASICs) can have thousands of cells with hundreds of tracks. Computer system 10 can receive a circuit description for layout 50 in the form of a hardware description language (HDL) file created by a designer or an electronic design automation tool. Layout 50 may be an initial layout for the integrated circuit design, or may be a layout resulting from one or more iterations of cell placement and circuit wiring, or other physical design steps.

Certain cells in layout 50 can be logically associated according to their related functionality. A group of such related cells is referred to as a logic cone. A logic cone is basically a schematic fragment, and can be any set of circuitry or logic devices, usually bounded by timing points such as registers, primary inputs/outputs, or black boxes. For example, a single logic cone may comprise multiple input latches connected to combinational logic cells which are further connected to output latches. A logic cone generally does not refer to the geometry of the physical design, and no such limitation should be inferred. The circuit designer can manually identify logic cones in the design, or the automated design tool can be programmed to define logic cones based on interconnection rules. The HDL file initially received by computer system 10 can include an identification of logic cones within the integrated circuit design.

FIG. 3 illustrates one logic cone in the integrated circuit design comprising a set of cells identified by hashing. These cells form a bounding box 52 for the logic cone. Functional cells of other logic cones are included in bounding box 52, as well as spare cell locations 54. The present invention allows either logic designers or circuit designers to independently mark each logic cone with a stability or confidence term that can be used within the synthesis flow to adjust the number or percentage of available spare cell locations (filler cells) around that particular logic cone. Based on the estimated stability of the logic cone, the synthesis tool can dynamically increase or decrease the total available filler cells available within the cone region.

Figure 1:
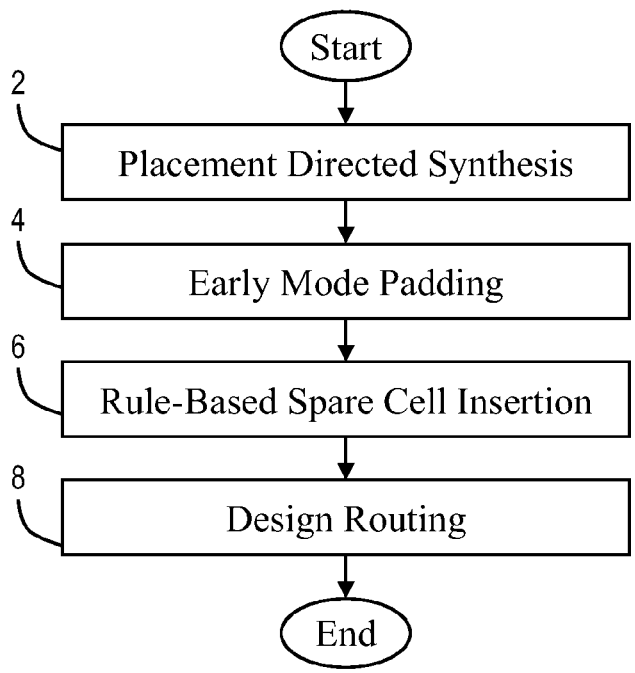
FIG. 1 is a chart illustrating the logical flow for a conventional integrated circuit design process which includes rule-based insertion of spare cell locations.
Figure 4:
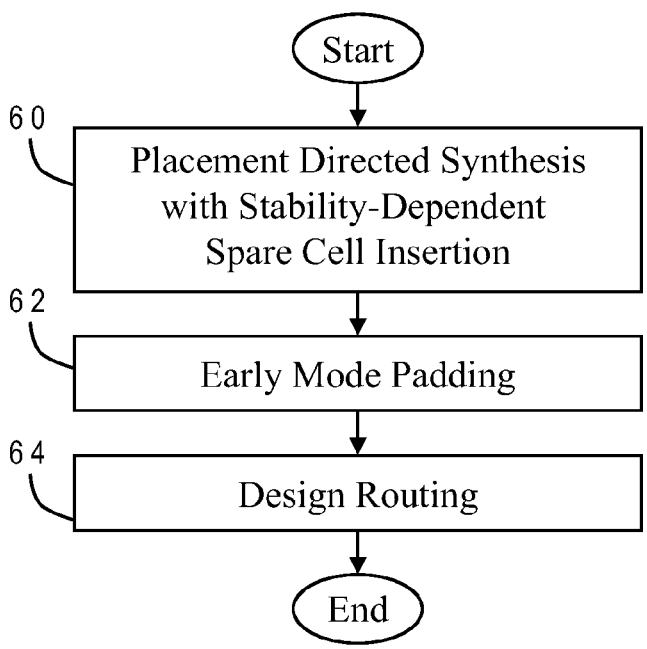
FIG. 4 is a chart illustrating the logical flow for an integrated circuit design process according to one implementation of the present invention wherein placement directed synthesis includes stability dependent spare cell insertion.

The present invention may further be enhanced by modifying the conventional design flow to enable cone-based spare cell insertion during placement directed synthesis, as illustrated in FIG. 4. According to this implementation, the process begins with placement directed synthesis which can be carried out by computer system 10, and may include traditional components such as technology mapping, physical placement of functional cells, electrical correction, and timing legalization (60). These components can be iteratively repeated. The present invention can include stability-dependent spare cell insertion with these iterations. Computer system 10 can dynamically calculate the amount of logic within a cone and the bounding box of the cone, and then determine how much space is available for spare cells to be placed. Using the confidence level supplied in the HDL or a parameter (parm) file and a placement algorithm (e.g., diffusion-based), spare cells are inserted in any critical areas with minimal perturbation to the existing design. After placement directed synthesis is complete, including spare cell insertion, the process continues with early mode padding (62), followed by design routing (64). This design process may include other elements not shown, such as refinement using move-bounded placement and buffer optimization which can recover most or all of the degradation (if any) caused by the spare cell insertion.

Figure 5:
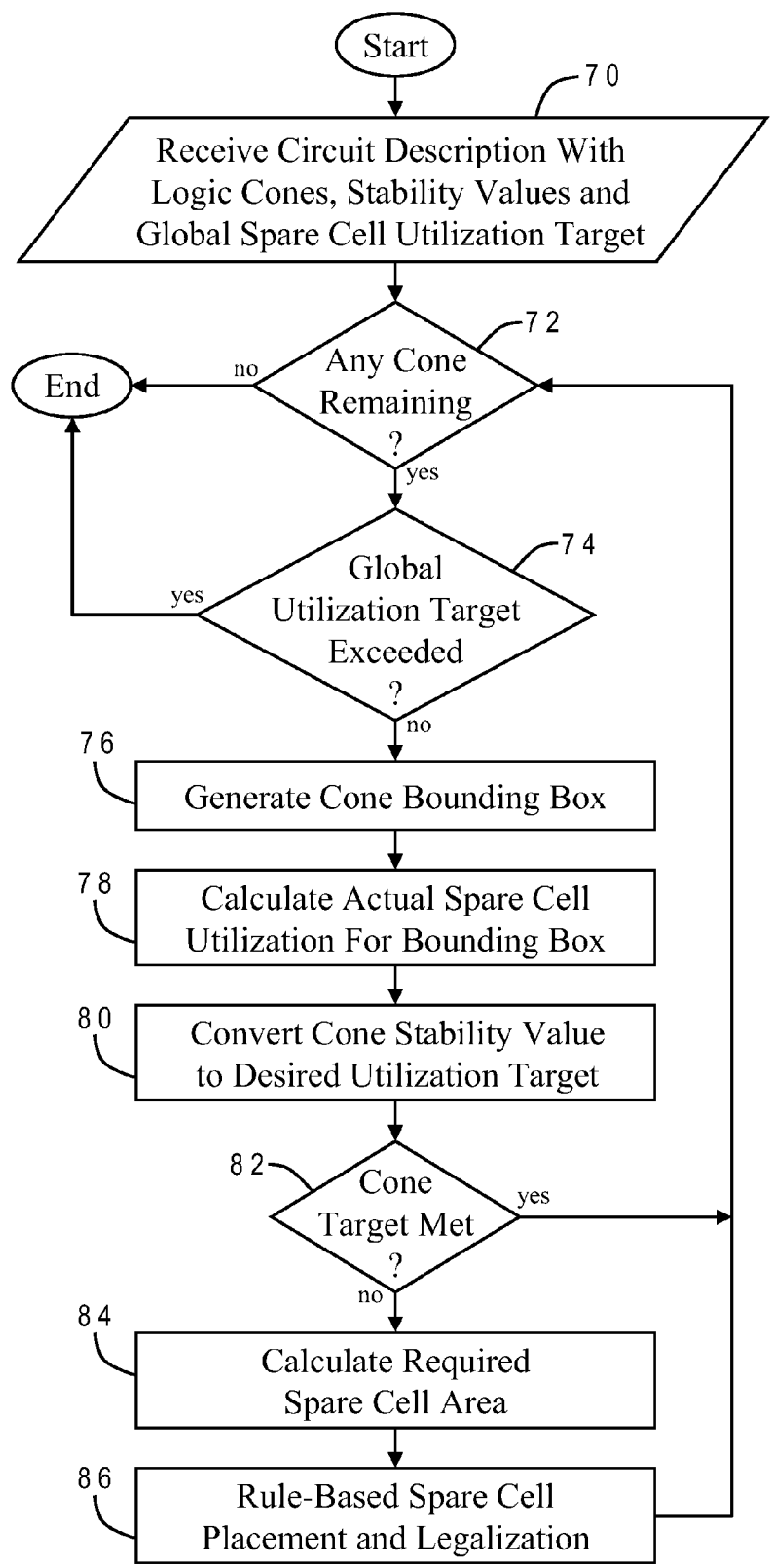
FIG. 5 is a chart illustrating the logical flow for stability dependent spare cell insertion in accordance with one implementation of the present invention.

The invention may be further understood with reference to the flow chart of FIG. 5, illustrating a preferred process for spare cell placement. The process can be carried out by computer system 10, and begins by receiving the circuit description including identification of logic cones in the layout with associated stability values, and a global spare cell utilization target (70). The process repeats iteratively for each logic cone in the description so there is a check at the beginning of each iteration to see if any logic cones still remain that require spare cell analysis (72). If so, a further check is performed to see whether the global utilization target has been exceeded by the actual spare cell utilization rate for the overall design (74). When the global utilization target has been exceeded, the process should skip further spare cell insertion even if logic cones remain for analysis, so the spare cell insertion process ends (i.e., continues to the next step according to the implementation of FIG. 4). If the global utilization target is not yet exceeded, the process carries out spare insertion for the logic cone being analyzed in the current iteration, beginning with generation of a bounding box for the cone (76). The bounding box can be calculated as the smallest X-Y coordinate distance in which all instance cells for a cone are contained. Computer system 10 then calculates the actual spare cell utilization rate within the bounding box of the cone (78). The utilization rate can be defined as the total area of all spare cells currently within the bounding box divided by the bounding box area. The stability value for the current cone is also converted into a desired utilization target for the cone (80). Different formulas may be used for this conversion, but in the preferred implementation a table lookup is used to correlate the stability value with a utilization factor, e.g., an 80% stability value corresponds to a 20% utilization target, a 90% stability value corresponds to a 1% utilization target, etc. Interpolation can be used for stability values not explicitly present in the table. The target utilization rate for the cone is compared to the actual utilization rate for the bounding box to see if the cone target is met (82). If so, no further spare cell insertion is required and the process repeats iteratively at decision box 72 (previous spare cell insertion for nearby logic cones may have already placed sufficient spare cells in the current region). If the cone target is not met, the process continues by calculating the amount of area within the bounding box required to insert enough spare cells to attain the cone target (84). Rule-based spare cell placement using conventional techniques can then be performed for the bounding box to insert a sufficient number of spare cells to fill the calculated area, including legalization (86). The rules for spare cell placement may for example include a minimum spacing requirement between spare cell locations. Spare cell placement can be made subject to other constraints; for example, the placement tool may provide fixed insertion rates for certain gate types or specific structures regardless of the stability value assigned by the designer to any related logic cones. Timing constraints can also be included.

Designers can choose different metrics to determine stability, or can select a stability value purely based on subjective experience. A default stability value can be used to allow the placement tool to run without designer input. The stability values can alternatively be derived automatically, for example, rule-based or from historical information regarding the subject logic cone in previous iterations of the synthesis flow. Stability values can generally be related to how new the logic is, e.g., a completely new design versus a design that has successfully been used in a previous integrated circuit. Specific parameters may include the amount of time that a design has spent in simulation testing and verification, the number of test cases which pass in simulations, the timing difficulty of the design, and whether the logic is considered critical for the particular integrated circuit product.

The present invention accordingly places spare cells in locations which more easily allow logic components to be added later for a new or modified design, such as from an engineering change order. The invention overcomes issues with prior art placement tools which tend to closely cluster logic, and is beneficial regardless of the quality of HDL in a design. Spare cell insertion is increased for less stable logic, and the logic/circuit designer has enhanced control of spare cell insertion for specific logic cones.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer-implemented method of placing spare cells in an integrated circuit design, comprising:
    receiving a description of the integrated circuit design which includes at least one logic cone in a layout and a stability value associated with the logic cone, by executing first program instructions in a computer system;
    assigning a desired spare cell utilization rate to the logic cone based on the stability value, by executing second program instructions in the computer system;
    calculating an actual spare cell utilization rate for a bounding box of the logic cone, by executing third program instructions in the computer system;
    determining that the actual spare cell utilization rate is less than the desired spare cell utilization rate, by executing fourth program instructions in the computer system;
    computing additional area required in the bounding box for attaining the desired spare cell utilization rate, by executing fifth program instructions in the computer system; and
    inserting, in the description of the integrated circuit design, one or more spare cells within the bounding box to completely fill the additional area, by executing sixth program instructions in the computer system.

2. The method of claim 1, further comprising deriving the stability value from historical information regarding the logic cone in at least one previous design iteration.

3. The method of claim 1 wherein the desired spare cell utilization rate is assigned using a table lookup.

4. The method of claim 1 wherein the actual spare cell utilization rate is a total area of all spare cells within the bounding box divided by an area of the bounding box.

5. The method of claim 1 wherein the description includes a plurality of logic cones in the layout with associated stability values, and further comprising iteratively repeating said assigning, calculating, determining, computing and inserting for each of the logic cones until a global spare cell utilization target is exceeded.

6. The method of claim 1 wherein the method is part of a placement directed synthesis, and further comprising early mode padding after completing said placement directed synthesis including spare cell placement.

7. A computer system comprising:
    one or more processors which process program instructions;
    a memory device connected to said one or more processors; and
    program instructions residing in said memory device for placing spare cells in an integrated circuit design, by receiving a description of the integrated circuit design which includes at least one logic cone in a layout and a stability value associated with the logic cone, assigning a desired spare cell utilization rate to the logic cone based on the stability value, calculating an actual spare cell utilization rate for a bounding box of the logic cone, determining that the actual spare cell utilization rate is less than the desired spare cell utilization rate, computing additional area required in the bounding box for attaining the desired spare cell utilization rate, and inserting, in the description of the integrated circuit design, one or more spare cells within the bounding box to completely fill the additional area.

8. The computer system of claim 7 wherein the stability value is derived from historical information regarding the logic cone in at least one previous design iteration.

9. The computer system of claim 7 wherein the desired spare cell utilization rate is assigned using a table lookup.

10. The computer system of claim 7 wherein the actual spare cell utilization rate is a total area of all spare cells within the bounding box divided by an area of the bounding box.

11. The computer system of claim 7 wherein the description includes a plurality of logic cones in the layout with associated stability values, and further comprising iteratively repeating said assigning, calculating, determining, computing and inserting for each of the logic cones until a global spare cell utilization target is exceeded.

12. The computer system of claim 7 wherein the spare cell placement is part of a placement directed synthesis, and said program instructions further carry out early mode padding after completing said placement directed synthesis including spare cell placement.

13. A computer program product comprising:
    a computer-readable storage medium; and
    program instructions residing in said storage medium for placing spare cells in an integrated circuit design, by receiving a description of the integrated circuit design which includes at least one logic cone in a layout and a stability value associated with the logic cone, assigning a desired spare cell utilization rate to the logic cone based on the stability value, calculating an actual spare cell utilization rate for a bounding box of the logic cone, determining that the actual spare cell utilization rate is less than the desired spare cell utilization rate, computing additional area required in the bounding box for attaining the desired spare cell utilization rate, and inserting, in the description of the integrated circuit design, one or more spare cells within the bounding box to completely fill the additional area.

14. The computer program product of claim 13 wherein the stability value is derived from historical information regarding the logic cone in at least one previous design iteration.

15. The computer program product of claim 13 wherein the desired spare cell utilization rate is assigned using a table lookup.

16. The computer program product of claim 13 wherein the actual spare cell utilization rate is a total area of all spare cells within the bounding box divided by an area of the bounding box.

17. The computer program product of claim 13 wherein the description includes a plurality of logic cones in the layout with associated stability values, and further comprising iteratively repeating said assigning, calculating, determining, computing and inserting for each of the logic cones until a global spare cell utilization target is exceeded.

18. The computer program product of claim 13 wherein the spare cell placement is part of a placement directed synthesis, and said program instructions further carry out early mode padding after completing said placement directed synthesis including spare cell placement.

19. A method of integrated circuit design comprising:
placement directed synthesis including cone-based, stability-dependent spare cell insertion;
early mode padding after completion of said placement directed synthesis; and
design routing after completion of said early mode padding, wherein said cone-based, stability-dependent spare cell insertion includes receiving a description of an integrated circuit design which includes at least one logic cone in a layout and a stability value associated with the logic cone, assigning a desired spare cell utilization rate to the logic cone based on the stability value, calculating an actual spare cell utilization rate for a bounding box of the logic cone, determining that the actual spare cell utilization rate is less than the desired spare cell utilization rate, computing additional area required in the bounding box for attaining the desired spare cell utilization rate, and inserting in the description of the integrated circuit design one or more spare cells within the bounding box to completely fill the additional area.

* * * * *